No. 800,306. PATENTED SEPT. 26, 1905.
E. KRAHNSTOEVER.
CLEANING DEVICE.
APPLICATION FILED DEC. 23, 1903.

Witnesses
Geo. W. Young
Hugo Fjahl

Inventor
Ernst Krahnstoever
By H. G. Underwood
Attorney

UNITED STATES PATENT OFFICE.

ERNST KRAHNSTOEVER, OF MILWAUKEE, WISCONSIN.

CLEANING DEVICE.

No. 800,306.  Specification of Letters Patent.  Patented Sept. 26, 1905.

Application filed December 23, 1903. Serial No. 186,383.

*To all whom it may concern:*

Be it known that I, ERNST KRAHNSTOEVER, a citizen of the United States, and a resident of Milwaukee, in the county of Milwaukee and State of Wisconsin, have invented certain new and useful Improvements in Cleaning Devices; and I do hereby declare that the following is a full, clear, and exact description thereof.

My invention has especial reference to devices for cleaning gloves; and it consists in certain peculiarities of construction and combination of parts, as will be fully set forth hereinafter in connection with the accompanying drawings and subsequently claimed.

Figure 1:
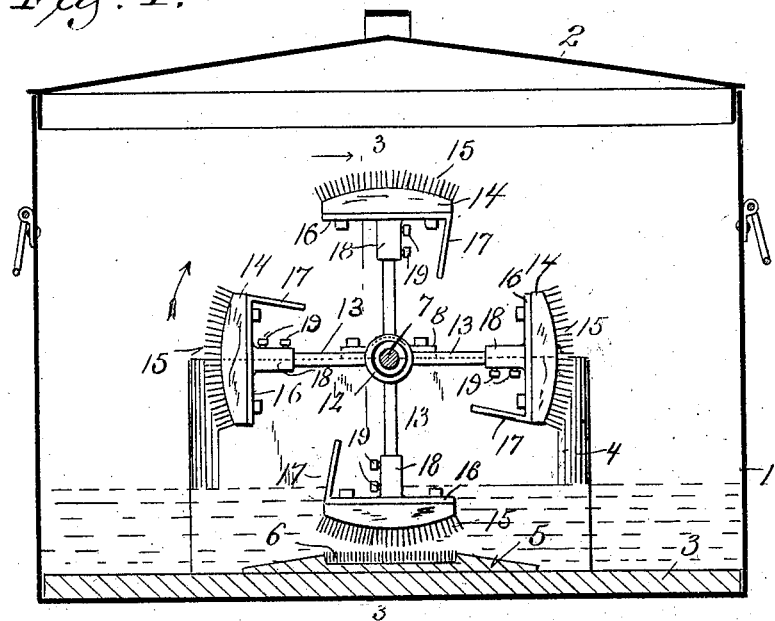
Figure 2:
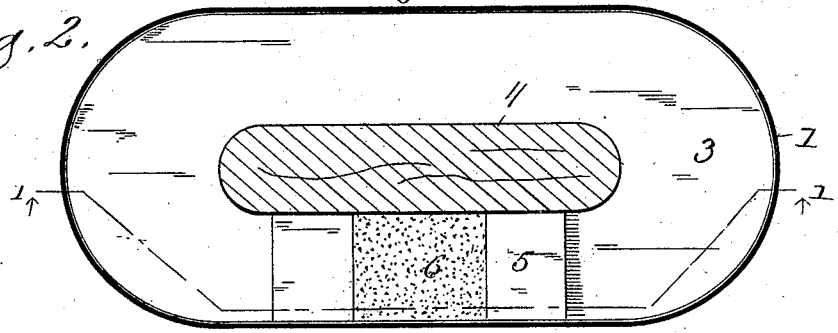
Figure 3:
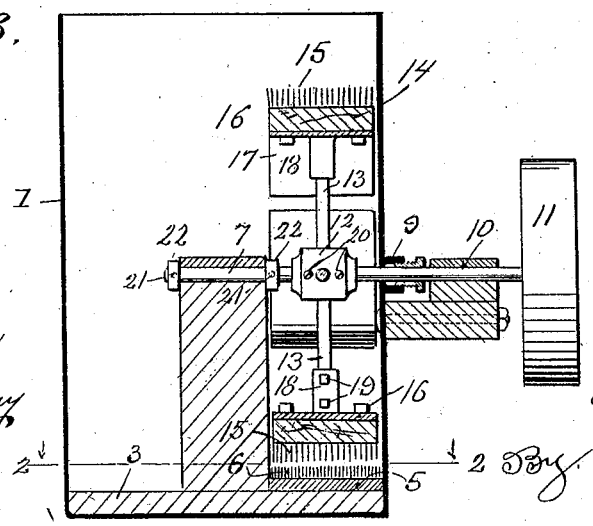

In the said drawings, Figure 1 is a vertical longitudinal sectional view of a tank or vat on the plane indicated by the line 1 1 in Fig. 2 and showing my device in side elevation. Fig. 2 is a horizontal sectional view on the plane indicated by the line 2 2 in Fig. 3. Fig. 3 is a vertical transverse sectional view on the plane indicated by the line 3 3 in Fig. 1.

Referring by numerals to the drawings, 1 indicates a tank or vat, preferably of sheet metal and herein shown as provided with a close cover 2. Fitting snugly within and resting on the bottom of said vat is a wooden platform 3, to which is secured a central vertical longitudinal partition 4, between which partition and one of the side walls of the vat is a bevel-ended flat support 5, carrying a horizontally-disposed brush 6.

7 designates a horizontal shaft whose inner end is journaled in a box 8 on the partition 4 and whose outer end projects through an opening in the vat-wall and through a stuffing-box 9 and journal-box 10 and there receives a pulley 11, by means of which power may be applied to revolve said shaft 7, while fast on the latter is a hub 12, into which are screwed the ends of spokes 13 13.

14 14 indicate the backs of brushes 15 15, the bristles projecting from said brush-backs preferably on the arc of a circle, and to the plain side of said brush-backs are secured plates 16 16, having each an obliquely and inwardly inclined end 17, and these plates and end plates being preferably of metal, although same may be made of wood. The plates 16 have each a projecting socket 18 for the reception of the adjacent spoke 13, to which it is adjustably secured by the set-screws 19 19, so that the projection of said brushes may be varied as desired.

The operation of my device will be readily understood from the foregoing description of its construction, taken in connection with the accompanying drawings. The vat 1 is partly filled with gasolene, preferably to the line indicated in Fig. 1, and then any suitable number of pairs of soiled kid gloves are put in the vat and the cover closed and shaft 7 revolved. The end plates 17 17 will act like paddles against the gasolene and cause same to move rapidly around the partition 4, carrying the gloves with it, and over the flat brush 6, while the movable brushes 15 15 also pass over the flat brush and the gloves, and in a short time the latter are thoroughly cleaned between the opposed brush-faces.

Should there be any occasion to remove the device from the vat for repair or otherwise, the set-screws 20 may be loosened in the hub and the set-screws 21 in the shaft-collars 22, and then the shaft 7 may be withdrawn from the vat and the hub, with the brushes on the end of the spokes, lifted out, and the platform 3 likewise lifted out, carrying the partition and flat brush with it, and the parts named can be readily replaced when desired.

Having thus described my invention, what I claim as new, and desire to secure by Letters Patent, is—

1. In a cleaning device, the combination with a vat, and a vertical partition extending from about the center toward the opposed ends thereof; of a stationary flexible brush arranged adjacent to the bottom of the vat between the partition and side wall thereof; a revolving shaft journaled in said partition and side wall; and a flexible yielding soft brushing-surface carried by said shaft and sweeping over the said stationary brush, whereby articles on this latter may be cleaned without being torn or injured.

2. In a cleaning device, the combination with a vat, and a vertical partition extending from about the center toward the opposed ends thereof; of a stationary brush secured adjacent to the bottom of the vat; a revolving shaft carrying a hub fast thereon; spokes radiating from said hub; brushes secured to the outer ends of said spokes; and inclined end plates extending inwardly from the backs of said last-named brushes.

In testimony that I claim the foregoing I have hereunto set my hand, at Milwaukee, in the county of Milwaukee and State of Wisconsin, in the presence of two witnesses.

ERNST KRAHNSTOEVER.

Witnesses:
    H. G. UNDERWOOD,
    HUGO FAHL.